United States Patent Office 3,364,130
Patented Jan. 16, 1968

3,364,130
REDUCING FOULING DEPOSITS IN
PROCESS EQUIPMENT
Robert E. Barnum, Scotch Plains, and Bruce G. Gillespie, Cranford, N.J., and Glenn A. Stankis, Baytown, Tex., assignors to Esso Research and Engineering Company, a corporation of Delaware
No Drawing. Filed June 8, 1966, Ser. No. 555,981
10 Claims. (Cl. 208—48)

ABSTRACT OF THE DISCLOSURE

To reduce or prevent the fouling of process equipment in petroleum or chemical industries wherein an organic feedstock is subjected to heat exchange at a temperature in the range of about 200° to about 1300° F., there is added to said organic feedstock a very low concentration, of the order of about 0.5 to 140 parts per million, of an amide condensation product of an aliphatic polyamine and an organic monocarboxylic acid of about 600 to 5000 molecular weight.

---

This invention concerns a method for reducing or preventing the fouling of process equipment in petroleum and chemical industries. It is particularly applicable to process equipment involving heat transfer at high temperatures. Preferably, the improved method comprises adding to the feedstock of a processing unit handling a hydrocarbon fraction or other organic chemical stream being heated, a very low concentration of an organic dispersant characterized as the amide condensation product of a high molecular weight organic monocarboxylic acid and an alkylene polyamine.

In various processes that invlove heating a feed stock to a high temperature, particularly in the petroleum industry, severe fouling of the equipment is often encountered. This is particularly so in the distillation of crude oils, in naphtha desulfurization processes, in gas oil cracking units, and in visbreaking operations involving heavy petroleum fractions. Thus, fouling problems may occur when feedstocks are heated to any temperature within the range of 200° F. up to cracking temperatures, and particularly at temperatures of 200 to 1300° F. The fouling problem is a serious one because, among other things, it causes heat transfer losses, increased pressure drops, and loss in throughput. The types of mechanical equipment that are most frequently affected by fouling include furnaces, pipes, heat exchangers, reboilers and condensers.

The deposits that are encountered as a result of the fouling phenomenon may consist of sticky, tarry, polymeric, or carbonaceous material. In some instances the fouling deposits will be associated with inorganic materials such as sand, scale, or salts which are "cemented" or otherwise caused to adhere to the surface of the equipment by this type of sticky, tarry, or carbonaceous fouling material. The sand may be present because of the lack of proper filtering of the crude oil that is being fed to the unit, while the scale may occur from deterioration of the metal in the equipment. Salts occur in the crude oil stream as a result of incomplete desalting of the crude or because the crude has not been subjected to any desalting treatment. Ordinarily, a crude is not desalted if the amount of salt does not exceed about 20 pounds per 1000 barrels of oil.

The fouling problems that are solved by the present invention are not confined solely to those wherein inorganic salts or sand or scale are also present, but include any of the fouling phenomena encountered in high temperature processing. The fouling phenomenon is believed to involve polymerization, or a combination of polymerization and oxidation or oxidative polymerization which in some respects is similar to that which causes gum to form in gasoline. The high temperatures that are attained in a heat transfer operation such as in the distillation of a crude oil or in process heating equipment feeding a catalytic reforming operation or a visbreaking operation, for example, can cause oxygen to react with the hydrocarbons in the feed to form a polymeric material which can deposit on the surfaces of the heat transfer equipment. If this polymerization can be prevented, fouling will likewise be prevented, since the binder for the inorganic deposits will thereby be eliminated. While fouling sometimes can be controlled by excluding oxygen from the feedstock, often this is not economically feasible. For example, the ordinary floating roof tank in which feedstocks are frequently stored will not completely prevent contact with oxygen of the air. Furthermore, many feedstocks contain oxygen when they are received at the refinery or at a unit in the refinery. When oxygen contamination thus cannot be prevented, use of an antifoulant may be the solution to the problem. In the prior art, various antifoulants have been suggested, including high molecular weight amino compounds.

In accordance with the present invention, it has been found that an effective class of antifoulants which function to inhibit polymerization or oxidative polymerization chain reactions and which are superior to prior art antifoulants, including high molecular weight amino compounds, are the organic dispersants that are prepared by the amide condensation of alkylene polyamines with high molecular weight monocarboxylic acids. Heretofore these materials have been known as dispersant additives for lubricating oils and particularly for crankcase oils. The functioning of these materials as dispersants in lubricating oils appears to depend on the presence of a long chain hydrocarbon portion which provides oil solubility and the presence of polar carboxy and nitrogen-containing groups which contribute dispersancy. In order to serve as dispersant materials, these additives must usually be employed in the lubricants in concentrations of at least 0.1 wt. percent and can be used for that purpose in concentrations of up to 10 wt. percent.

It has now been surprisingly found that at much lower concentration levels, of the order of 0.5 to 140 parts per million, organic dispersants of this type serve to prevent fouling. It is postulated that these additives function in either of two ways, or by a combination of both; they may prevent the formation of high molecular weight polymeric material in hydrocarbon feed streams and other organic chemical streams that are subjected to high temperatures in heat exchange operations, or if any such material is formed, they keep it in suspension in the stream in the form of such small and non-sticky particles that no fouling tendency exists. This finding constitutes a new and unexpected utility for these materials and one that furnishes a number of economic advantages. When it is realized that each time a unit must be shut down for the purpose of removing fouling deposits, mechanical costs of the order of $500 to $20,000 are involved per unit, and, in addition, even greater costs are incurred due to lost production, it is an obvious saving to delay as long as possible the need for such a procedure, commonly referred to as "turnaround."

While it was previously proposed to employ acylated amines, e.g., imides, prepared from polyamines and aliphatic-substituted succinic acids or their anhydrides as antifoulants for hydrocarbon feed stocks that are subjected to high temperatures as taught, for example, in U.S. Patent 3,235,484, the present invention constitutes an improvement over such prior teachings in that the amide condensation products of monocarboxylic acids and polyamines are effective at lower concentrations than are the corresponding succinic acid derivatives and are also more stable to heat, thus making their use more advantageous, particularly for operations in which a temperature of 500° F. or higher is involved.

The invention is particularly applicable to the treatment of any normally liquid hydrocarbon feed stream and especially to the treatment of liquid petroleum fractions ranging through light distillate stocks, e.g., naphthas, kerosenes and the like, middle distillate stocks such as gas oils, lubricating oil fractions, cycle stocks from cracking operations, virgin crude oils, topped crude oils, etc. As has already been stated, the antifoulants used in the present invention are condensation products of high molecular weight organic monocarboxylic acids and alkylene polyamines, condensation being effected under conditions which cause the formation of amides. The polyamines can be condensed with monocarboxylic acids using equal molar proportions of the acid and polyamine or an excess of the carboxylic acid. The amount of acid used in the reaction should be sufficient to react with at least one amino group per molecule of polyamine and it may range up to sufficient acid to react with every amino group per molecule of the polyamine. Preferably the polyamine is an alkylene polyamine having from 3 to 8 amino groups and the proportion of carboxylic acid to amine ranges from 1 to 5 moles of acid per mole of polyamine. The acid is reacted with the alkylene polyamine in the presence of heat at a temperature of about 200 to 400° F. so as to drive off water that is split out in the reaction. The evolved water will readily be removed by blowing an inert gas such as nitrogen through the reaction mixture during the course of the reaction. Generally, temperatures in the range of 250 to 350° F. will adequately bring about the reaction. For example, heating may be conducted at from 6 to 20 hours at 275 to 320° F.

The aliphatic polyamine that is employed in preparing the reaction products of the present invention can be an alkylene polyamine fitting the following general formula:

$$NH_2(CH_2)_n-[NH(CH_2)_n]_m-NH_2$$

wherein $n$ is 2 to 4 and $m$ is a number from 0 to 10. Specific compounds coming within the formula include diethylene triamine, triethylene, tetramine, tetraethylene, pentamine, dibutylene triamine, dipropylene triamine, hexaethylene heptamine, octaethylene nonamine, and tetrapropylene pentamine. N,N-di-(2-aminoethyl)ethylene diamine may also be used. Other aliphatic polyamine compounds that can be used include the N-aminoalkyl piperazines of the formula:

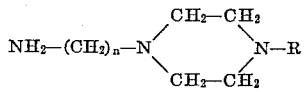

wherein $n$ is a number 1 to 3, and R is hydrogen or an aminoalkyl radical containing 1 to 3 carbon atoms. Specific examples include N-(2-aminoethyl)piperazine, N-(2-aminoisopropyl)piperazine, and N,N'-di-(2-aminoethyl)piperazine.

Still other alkylene amino compounds that can be used include dialkylamino alkyl amines such as dimethylamino methyl amine, dimethylamino propyl amine, methylpropylamino amyl amine, etc. These can be characterized by the formula:

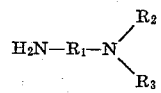

wherein $R_1$ is an alkylene radical, e.g., an ethylene, propylene, or butylene radical, and $R_2$ and $R_3$ are $C_1$ to $C_5$ alkyl radicals.

Thus, the alkylene polyamine or aliphatic polyamine compounds used in this invention can be broadly characterized as alkylene amino compounds containing 2 to 12 nitrogen atoms wherein pairs of nitrogen atoms are joined by alkylene groups of from 2 to 4 carbon atoms. Mixtures of alkylene polyamines, dialkylamino alkyl amines, mixtures of N-aminoalkyl piperazines, and mixtures of the alkylene polyamines with the N-aminoalkyl piperazines can also be used.

Monocarboxylic acids for use in the present invention will have molecular weights in the range of about 600 to 5000, preferably about 700 to 3000. Such acids can be prepared by oxidizing high molecular weight olefins, for example, polyisobutylene of about 900 molecular weight, with an oxidizing agent such as nitric acid or oxygen, by addition of an aldehyde to an olefin followed by oxidation of the adduct, or by addition of halogen to a high molecular weight olefin to form a dihalogen compound followed by hydrolyzing oxidation of the latter. These procedures are taught in British Patent No. 983,040.

The monocarboxylic acids and derivatives thereof can also be obtained by oxidizing a monohydric alcohol with potassium permanganate or by reacting a halogenated high molecular weight olefin polymer with a ketene. Another convenient method for preparing the monocarboxylic acids involves the reaction of metallic sodium with an acetoacetic ester or a malonic ester of an alkanol to form a sodium derivative of the ester and the subsequent reaction of the sodium derivatives with a halogenated high molecular weight hydrocarbon such as brominated wax or brominated polyisobutylene.

Monocarboxylic acids can also be prepared from olefin polymers such as a polymer of a $C_2$ to $C_5$ monoolefin, e.g., polypropylene or polyisobutylene by halogenating the polyolefin and then condensing it with an unsaturated monocarboxylic acid. Examples of suitable olefin polymers include polyethylene, polypropylene, or polyisobutylene, having an average molecular weight (Staudinger) of about 600 to 3000, preferably 800 to 1900. Polyisobutylene is preferred, since it has a lessened tendency to gel the product, as compared to some of the other polyolefins such as polyethylene and polypropylene. The polymer is halogenated by contacting the polymer with either bromine or chlorine, preferably by blowing chlorine through the polymer, to provide about one to two atoms of halogen per molecule of polymer. The halogenation step may be conducted in the temperature range of from about 50 to about 300° F. To aid in the halogenation step, the polymer may be dissolved in a suitable solvent, such as carbon tetrachloride, in order to lower the viscosity of the polymer. However, the use of such a solvent is not necessary.

The time required for halogenation may be varied to some extent by the rate at which the halogen is introduced. Ordinarily from about 2 to about 5 hours is a satisfactory halogenation period. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 250° F.

The halogenated polymer thus obtained is condensed with an alpha, beta-unsaturated, monocarboxylic acid of from 3 to 8 carbon atoms. Ordinarily, because of their greater availability, acids of this class having 3 or 4 carbon atoms will be used. Such acids include acrylic acid, alpha-methyl-acrylic acid (i.e., 2-methyl propenoic acid) and crotonic or isocrotonic acid (beta-methylacrylic acid). Other alpha, beta-unsaturated acids that may be employed include tiglic acid (alpha-methyl crotonic acid), angelic acid (alpha-methylisocrotonic acid), sorbic acid, and cinnamic acid. Esters of such acids, e.g., ethyl methacrylate, may be employed if desired in place of the free acid.

In condensing the halogenated polyolefin with the unsaturated acid, at least one mole of acid is used per mole of halogenated polyolefin. Normally, the acid will be employed in excess and may amount to as much as 1.5 to 2 moles per mole of halogenated polyolefin. The condensation temperature may be in the range of from about 300° to 500° F. and will more preferably be within the range of from about 375° to 475° F. The condensation may require from about 3 to about 24 hours, but will ordinarily take place in from 6 to 18 hours. After the reaction has been completed, excess acid may be purged from the mixture, for example, by blowing with a stream of nitrogen at a temperature of 400° to 500° F.

High molecular weight carboxylic olefin acids of this type may also be prepared by a so-called one-step process involving the halogenation of the olefin polymer in the presence of the alpha, beta-unsaturated acid. Using proportions of reactants within the ranges discussed above, the starting acid and the olefin polymer are mixed together in the reactor, the temperature being kept below about 150° F. until the start of halogen introduction so as to avoid homopolymerization of the alpha, beta-unsaturated acid. Once halogenation has begun, the temperature may be raised to as high as 250° F. After halogen introduction, the temperature may be raised to 300 to 500° F. to effect the condensation reaction.

The method of this invention can be applied to any of a number of treating steps, including treating a crude petroleum feed stock entering a crude distillation unit, the reduced crude feed stock entering a visbreaking unit, the light naphtha stock entering a pre-treating zone prior to a catalytic reforming zone, the naphtha or heavier feed stock entering the feed heat exchanger to a desulfurizing unit, and the gas oil feed entering the preheater of a catalytic cracking unit. While the antifoulant could be fed directly to the unit in which fouling occurs, it is preferred to add it to the feed stock just ahead of the zone in which the problem arises. Other processes to which the method is applicable include thermal hydrodealkylation of aromatics, dehydrogenation of ethyl benzene, and high temperature steam cracking of petroleum hydrocarbons. The amount of antifoulant added to the feed stream will be in the range of from about 0.5 to 140 parts per million by weight or more generally from about 0.5 to 60 parts by weight per million. In many cases it will be found sufficient to use from 0.5 to about 10 parts by weight per million of the material being treated, and in other instances, from 0.5 to 5 parts will be enough. The use of the antifoulant does not interfere in any way with the process to which the feed stream is being subjected.

In some instances reduction of fouling is further improved by employing in conjunction with the dispersant additives certain antioxidants, including phenyl alpha-naphthyl amine, and amino alkyl phenols, which are the condensation products of $C_1$ to $C_3$ aldehydes, $C_2$ to $C_5$ alkylene diamines and alkyl phenols of $C_4$ to $C_{16}$ alkyl groups, e.g., the condensation product of 2 moles of formaldehyde, 2 moles of nonyl phenol and 1 mole of diethylene triamine. These antioxidant materials will generally be used in concentrations in the range of from 0.5 to 40 parts per million based on the weight of feed; they may comprise typically from 5 to 50% by weight of the antifoulant package.

The nature of this invention will be more clearly understood when reference is made to the following examples wherein specific embodiments of the invention are described.

Example 1.—Preparation of dispersant

A dispersant material was prepared in the following manner:

A 110-pound portion of polyisobutylene of 780 molecular weight was heated to 250° F., then a stream of chlorine was passed through the heated polyisobutylene at the 250° F. temperature at a rate of 2.5 pounds of chlorine per hour for a total of 4 hours, the total chlorine treat thus being 10 pounds. A sample of the chlorinated product analyzed 4.3% chlorine and the product had an API gravity of 23.3. To the chlorinated polyisobutylene there was added 10.5 pounds of acrylic acid. Over a period of two hours the temperature was raised from 250° F. to 425° F. and the pressure was increased to 20 p.s.i.g. Heating was continued for 5 hours at 425° F. and the reaction vessel was vented to maintain the pressure of 20 p.s.i.g. The pressure was then released and the mixture was purged with nitrogen for 2 hours to remove unreacted acrylic acid. The polyisobutenyl propionic acid thereby obtained at the end of the reaction weighed 109.3 pounds and had a total neutralization number (ASTM D-664) of 46.2 milligrams of KOH per gram. The chlorine content was found to be 0.3 weight percent.

A 70-pound portion of the polyisobutenyl propionic acid obtained as just described was mixed with 31.5 pounds of a solvent neutral mineral lubricating oil (150 SSU at 100° F.) and the resulting mixture was reacted with 3.38 pounds of tetraethylenepentamine at 300° F. for 9 hours, the mixture being maintained at reduced pressure (28 inches of vacuum) and purged with a stream of nitrogen during the 9-hour reaction period to remove water as it was formed. The reaction mixture was then filtered through diatomaceous earth. The product analyzed 1.2 weight percent nitrogen and was in the form of a concentrate containing about 70 weight percent of reaction product and 30 weight percent of diluent mineral oil. Yield of product was 98.5 pounds.

Example 2

Example 1 was repeated, except that diethylene triamine was employed in place of tetraethylene pentamine. The mole ratio of diethylene triamine to polyisobutenyl propionic acid was 1:3. The product was obtained as a 70 weight percent concentrate in mineral lubricating oil.

Example 3

Polyisobutylene of about 1000 molecular weight is oxidized by boiling 200 parts by weight of the polyisobutylene under reflux with 200 parts by weight of 65 weight percent nitric acid that has been diluted with 400 parts by weight of water. The reaction is conducted for 40 hours with continuous stirring, after which the reaction product is cooled and washed with water until the wash water is acid free. There is obtained after drying 190 parts by weight of a high molecular weight carboxylic acid having an acid content of 0.5 milliequivalent per gram. A mixture is prepared consisting of 100 parts by weight of the carboxylic acid thus obtained and 15 parts by weight of tetraethylene pentamine. This mixture is heated to 355° to 360° F. for 8 hours while a stream of nitrogen is blown through the reaction mixture to remove water of reaction. There is obtained about 100 parts by weight of an amide having a nitrogen content of about 2.4 weight percent.

Example 4

To a reduced crude feed entering a visbreaking operation there was added 25 parts by weight per million of the product concentrate of Example 1. Prior to this treatment, the heating tube temperature at a constant feed rate was found to be 1175° F. Using the same feed rate and adding the antifoulant material of Example 1 in the mentioned concentration improved the heat exchange efficiency so that the tube temperature was reduced to 1100° F. This lowering of 75° F. in the tube temperature is extremely significant in that it reduced the deposition of carbon in the furnace tubes. At the same time it was noted that the tendency for the level control valve of the visbreaker to become blocked was materially reduced, and overall smoothness of the operation was enhanced.

Example 5

The product of Example 1 was compared with a number of prior art materials marketed as antifoulants with respect to the effectiveness of these materials to reduce fouling in the 5-hour Erdco CFR fuel coker test described in the article of A. W. Frazier et al., published in the Oil and Gas Journal, May 3, 1965, volume 63, number 18, page 117. In each case the amount of antifoulant that was used was 40 parts by weight per million of feed stock. The feed stock was catalytic reformer feed splitter bottoms having a boiling range of about 176° to 320° F. The results of the tests on the various antifoulants are given in Table I which follows. The fouling slope for each blend of feed stock and antifoulant was determined as described in the Oil and Gas Journal article and the reduction in slope as compared with the feedstock alone was calculated on a percentage basis. The greater the reduction in slope, the better the antifoulant. The preheater rating was obtained by weighing the preheater tube before and after the test. Here again the results are expressed as percent reduction over the run without additive.

TABLE I.—FUEL COKER TEST RESULTS

| Antifoulant | Percent Reduction | |
|---|---|---|
| | Preheater Rating | Fouling Slope |
| Product A | Nil | 29 |
| Product B | 10 | 24 |
| Product C | 38 | 64 |
| Product D | 38 | 71 |
| Product E | −17 | −6 |
| Product F | 8 | 18 |
| Product G | Nil | 37 |
| Product H | 8 | 64 |
| Example 1 Product Concentrate | 43 | 87 |

It will be seen that the product of Example 1 was much more effective than any of the commercial antifoulants in reducing fouling of the coker, both as measured by tube deposits and as determined from the fouling slope. The exact nature of the commercial antifoulants was not known, but products E and F contained sulfonic acid groups, product D contained amino groups, and the remaining products were believed to be derivatives of amino compounds.

The greater heat stability of a monocarboxylic acid amide of the present invention as compared to the prior art polyalkylene polyamine alkenyl succinimide is demonstrated by comparative tests run in a high temperature Caterpillar Diesel 1-H test using an SAE 30 lubricating oil, to separate portions of which had been added either 1 weight percent of the 70% additive concentrate of Example 1 or 1 weight percent of a 70 weight percent concentrate of an alkenyl succinimide prepared by reaction of tetraethylene pentamine with polyisobutenyl succinic anhydride derived from 900 mol weight polyisobutylene. The blend containing the Example 1 concentrate gave a top ring groove rating of 1% deposits as compared with 17% deposits for the blend containing the succinimide concentrate, which can be attributed primarily to greater stability against thermal breakdown of the Example 1 additive in this severe high temperature test.

*Example 6*

To a heavy naphtha cut, which was essentially a virgin kerosene, there was added 1.25 parts by weight per million of the product of Example 1. This naphtha cut had an initial boiling point of 304° F., a 50% point of 400° F., and a final boiling point of 488° F. as determined by ASTM distillation procedures. The untreated naphtha cut and the naphtha cut containing the additive were each subjected to the Erdco Fuel Coker Test referred to in Example 5. The pressure drop across the filter was measured at frequent intervals and a notation was made of the time at which the pressure drop had reached 25″, if such was the case. A large pressure drop indicates the accumulation of a considerable amount of carbonaceous material on the filter; conversely, a small pressure drop indicates that little or no carbonaceous material has deposited on the filter. The results of these tests are given in the following Table II. It will be noted from the data that even at the very low concentration level of 1.25 parts per million, the amide reaction product of Example 1 was very effective in reducing fouling deposits.

TABLE II.—COKER TEST RESULTS

| | Pressure Drop | Minutes to Reported Pressure Drop |
|---|---|---|
| Untreated Naphtha | 25 inches, Hg | 170 |
| Naphtha plus 1.25 p.p.m. Example 1 Product | 1 inch | 300 |

*Example 7*

The product of Example 3 is added at the rate of 10 parts by weight per million to a gas oil feed stock entering a catalytic cracking petroleum refinery unit to reduce fouling deposits and thereby extend the time before turnaround, or downtime, for cleaning.

*Example 8*

To reduce fouling deposits in a crude oil distillation unit, there are added to the crude oil feed 15 parts per million by weight of the product concentrate of Example 2 and 5 parts per million by weight of phenyl alpha naphthylamine.

*Example 9*

Ethyl benzene, being fed to a dehydrogenation unit is treated to reduce deposit tendencies by adding thereto 5 parts by weight of the product concentrate of Example 1.

*Example 10*

The product concentrate of Example 2 was added to a No. 2 heating oil (ASTM D-396-48T) comprising a mixture of virgin distillate and catalytically cracked distillate stocks. The amount of additive concentrate added was 35 pounds per thousand barrels of heating oil (1 barrel=42 gallons). A similar blend was prepared using the same amount of the Example 1 concentrate. Each of these blends and the untreated heating oil were subjected to the 300° F. accelerated fuel oil stability test. This test is normally used to rate stability of heating oils or diesel fuels, but it also can be considered to rate fouling tendency, inasmuch as the amount of residue collected on the test blotter can be a measure of potential fouling material. The test, described by E. I. du Pont de Nemours and Company as petroleum laboratory method No. F21-61, also is known by a variety of names, including the EMD diesel fuel stability test, the Union Pacific diesel blotter test, and the Nalco 300° F. test.

Briefly, this test is conducted as follows: The sample to be tested is filtered and the filtered sample is then placed in a test tube and aged by heating in an oil bath held at 300°±5° F. for 90 minutes. The aged sample is then removed from the oil bath, allowed to cool to room temperature over a period of about two hours, and then filtered under vacuum (16 in. of mercury) through No. 1 Whatman filter paper. The test tube is rinsed three times with normal heptane and each wash is transferred to the filter paper in the holder, after which the filter paper is washed with normal heptane until it is free of test oil. After the filter paper has been dried, the stain is compared visually with a set of reference standards having a numerical rating range of 1 to 20, in which 1 is the cleanest and 20 is the dirtiest of the standards.

The results obtained were as follows:

Blend tested: Blotter rating
    Original (no additive) _____ 16
    Example 1 product _____ 12
    Example 2 product _____ 9

These results show that both additives were effective antifoulants, the Example 2 product being somewhat better than that of Example 1.

It is to be understood that this invention is not to be limited to the specific embodiments herein presented by way of example. The scope of the invention is to be determined by the appended claims.

What is claimed is:

1. A method for treating an organic feed stock that is fed to a heat exchange step wherein it is subjected to a temperature in the range of about 200° F. to about 1300° F. which comprises adding to said feed stock from 0.5 to 140 parts per million, based on the weight of the feed stock, of the amide condensation product of an organic monocarboxylic acid of from 600 to 5000 molecular weight and an aliphatic polyamine, whereby fouling of heat exchange equipment as the result of oxidation or polymerization of feed stock constituents is reduced.

2. Method as defined by claim 1 wherein said aliphatic polyamine is an alkylene amino compound having from 2 to 12 nitrogen atoms wherein pairs of nitrogen atoms are joined by alkylene groups of from 2 to 4 carbon atoms.

3. Method as defined by claim 1 wherein said condensation product is added to a liquid hydrocarbon feed stock in a concentration of from 0.5 to 10 parts by weight per million.

4. Method as defined by claim 1 wherein said organic feed stock comprises a normally liquid petroleum hydrocarbon fraction.

5. Method as defined by claim 1 wherein said condensation product has been obtained by the condensation of one to five moles of said monocarboxylic acid with about one mole of an alkylene polyamine having from three to eight amino groups.

6. Method as defined by claim 1 wherein said condensation product is the product of condensing an alkylene polyamine with a polyolefin monocarboxylic acid wherein said polyolefin group has a molecular weight of 600 to 3000 and is a polymer of a $C_2$ to $C_5$ monoolefin.

7. Method as defined by claim 1 wherein said condensation product is the product of condensing an alkylene polyamine with a monocarboxylic acid derived by halogenating polyisobutylene of about 800 to 1900 molecular weight and then reacting the halogenated polymer with an alpha, beta-unsaturated monocarboxylic acid of 3 to 8 carbon atoms.

8. Method as defined by claim 1 wherein said condensation product is obtained by reaction of polyisobutenyl propionic acid with tetraethylene pentamine.

9. Method as defined by claim 1 wherein said condensation product is obtained by reaction of polyisobutenyl propionic acid with diethylene triamine.

10. Method as defined by claim 1 wherein said condensation product is added to a liquid hydrocarbon feed stock in a concentration in the range of 0.5 to 5 parts by weight per million.

References Cited

UNITED STATES PATENTS

| | | | |
|---|---|---|---|
| 3,017,343 | 1/1962 | Pollitzer | 208—47 |
| 3,172,892 | 3/1965 | Le Suer et al. | 260—326.5 |
| 3,219,666 | 11/1965 | Norman et al. | 260—268 |
| 3,224,957 | 12/1965 | Kent | 208—48 |
| 3,235,484 | 2/1966 | Colfer | 208—48 |
| 3,271,295 | 9/1966 | Gonzalez | 208—48 |

FOREIGN PATENTS 983,040  2/1965  Great Britain.

DELBERT E. GANTZ, *Primary Examiner.*

G. E. SCHMITKONS, *Assistant Examiner.*